Patented Dec. 2, 1924.

1,517,891

UNITED STATES PATENT OFFICE.

WALTER H. DICKERSON, OF EAST ORANGE, NEW JERSEY, ASSIGNOR TO INDUSTRIAL WASTE PRODUCTS CORPORATION, OF DOVER, DELAWARE, A CORPORATION OF DELAWARE.

POWDERED SODIUM SILICATE AND PROCESS OF PREPARING THE SAME.

No Drawing.   Application filed September 1, 1922.   Serial No. 585,800.

*To all whom it may concern:*

Be it known that I, WALTER H. DICKERSON, a citizen of the United States, and a resident of East Orange, in the county of Essex and State of New Jersey, have invented certain new and useful Improvements in Powdered Sodium Silicates and Processes of Preparing the Same, of which the following is a specification.

The invention relates to a method of preparing sodium silicate in the form of a dry powder, and to the novel product produced thereby, which is in the form of more or less dense and readily soluble particles of globular shape and having a hardened surface resistant to hygroscopic action. It has for its object a process for producing such material under control as to density and amount of retained mosture and in a commercial marketable form, the finished product being in a condition which obviates caking of the small individual particles composing the powder.

I have found that by suitably controlling the pressure and temperature conditions and the concentration of the solution of the sodium silicate to be dried, a product may be obtained having the desirable characteristics hereinbefore mentioned. This is attained by employing pressures and temperatures greatly in excess of those heretofore proposed in the production of silicate of soda in powdered form by spray drying a solution of the same. For example, as disclosed in U. S. Letters Patent No. 1,198,203, it is proposed to atomize a solution of the sodium silicate, under a solution pressure of 15 to 20 lbs. and an atomizing gas pressure of from 2½ to 8 atmospheres, into a drying gas, or column of air, maintained at between 140° F. and 200° F. The product resulting from a treatment under such conditions will not be protected against a caking action as the surface of the particles composing same is susceptible to the absorption of moisture, and thereby in a condition to readily cohere into a mass. Attempts to obtain a satisfactory dry product by evaporating in vacuo and then grinding the mass have also not met with success because of the caking of the resultant powder in package; and, furthermore, because the product is not readily soluble.

By the intensive evaporation produced under the conditions prevailing in the carrying out of the improved process, a sealing or hardened surface is provided on the individual particles and which surface is highly resistant to any hygroscopic action especially when the powdered product is first properly cooled. The particles thus maintain the dehydrated state to a degree sufficient to prevent any caking action among same upon subsequent exposure to normal atmospheric conditions and are not affected thereby to any appreciable extent when packed in the ordinary commercial manner.

I have, furthermore, determined that there exists a definite relation among the controlled conditions, viz: concentration and temperature of the solution sprayed, and the spray pressure, and the initial and final temperatures of the gaseous medium into which the solution is sprayed. For example, by employing high spray pressures, a higher initial temperature of the gaseous drying medium is permissible without seriously affecting the weight per unit volume of the product, and a better thermal efficiency of operation is obtained. The degree of subdivision, moreover, is dependent upon the concentration of the solution, as well as upon its temperature, the solution, just previous to spraying, in some instances being in super-heated condition, thereby facilitating the drying of the product. By varying these conditions, a wide range is afforded in the physical character of the finished product particularly as to density and size of the individual particle.

For example, one product obtained from a solution of sodium silicate of a density of 42½ degrees Baumé weighed 26 lbs. per cubic foot with moisture content of 18%; while a further product, made from the same material and of a moisture content of 17%, weighed 33 lbs. per cubic foot. This was due to the greater intensity of the drying action in the case of the former product which was sprayed at a higher initial temperature and whose particles were of a coarser nature than those of the latter product.

The character of the surface, also, is a factor in the free flowing property of the powder and its tendency to resist caking. For example, of two products obtained from the same solution and having a moisture content respectively of 16.65% and 16.20%, the former was a better flowing powder and more resistant to hygroscopic action than the other tho containing the larger percentage of moisture.

As a specific example, I have found that a satisfactory commercial product containing from 15 to 20 per cent of moisture, which renders same readily soluble, may be produced by spraying a 40 per cent solution of sodium silicate, approximately at the boiling point, under a pressure of from 400 to 500 lbs. per square inch into a gaseous drying medium as air or gaseous products of combustion, the latter being at an initial temperature of from 600° F. to 650° F. and the final drying temperature of which is reduced to approximately 200° F.; whereupon it is preferably cooled to 140° F. or less.

However, I do not desire to limit myself to the specific pressures and temperatures noted, as the spray pressures may vary from 150 to 1500 lbs. per square inch and the temperatures of the gaseous medium from 300° F. to 650° F. initial temperature, with final drying temperatures of 200° F. or less. In connection with the final temperature to which the dried product is exposed after the dehydrating treatment at relatively high temperatures, I have found that it is advisable to further cool the particles to a substantial extent, for example, to temperatures of 140° F. or less. Otherwise, there may occur a "sweating" action of the interior moisture, even thru the glazed surface of the particles, and thus destroy the resistance to hygroscopic action and caking. The particles are best cooled while in suspension to below the point where such "sweating" action takes place, and the desirable non-caking property thereof thus preserved. This may be effected, for example, by introducing the particles, preferably in suspension, into a zone of cooling gas; or, by chilling the entire mass of drying gas with particles suspended therein as by introducing the proper volume of cool gas.

The proper temperature to which the particles are to be cooled, however, will depend upon the contained moisture of the final product as well as upon the relative proportions of soda and silica.

I claim:—

1. Sodium silicate in the form of a dry powder composed of globular particles having a hardened glazed surface.

2. Sodium silicate in the form of a dry powder composed of individual globular particles, having a hardened glazed surface, readily soluble in water and containing from 15 to 20 per cent of moisture.

3. The method of producing sodium silicate in dry powdered form, which consists in subjecting a solution of same in finely divided state to a gaseous drying medium having an initial temperature in excess of 300° F.

4. The method of producing sodium silicate in dry powdered form, which consists in spraying a super-heated solution of same into a gaseous drying medium having an initial temperature in excess of 300° F.

5. The method of producing sodium silicate in dry powdered form, which consists in spraying a solution of same under a pressure in excess of 150 lbs. per square inch and below 1500 lbs. per square inch into a gaseous drying medium having initial temperature in excess of 300° F. and below 650° F.

6. The method of producing sodium silicate in a dry powdered form, which consists in spraying a solution of same under a pressure in excess of 150 lbs. per square inch into a gaseous drying medium having an initial temperature in excess of 300° F. and a final temperature of approximately 200° F.

7. The method of producing sodium silicate in a dry powdered form, which consists in spraying a forty per cent (40%) solution of same under a pressure of from 400 to 500 lbs. per square inch into a gaseous drying medium having an initial temperature of approximately 200° F.

8. The method of producing sodium silicate in dry powdered form, which consists in spraying a solution of same under a pressure in excess of 150 lbs. per square inch into a gaseous drying medium having an initial temperature in excess of 300° F., and a final drying temperature of approximately 200° F., and then further cooling the particles.

9. The method of producing sodium silicate in dry powdered form, which consists in spraying a solution of same under a pressure in excess of 150 lbs. per square inch into a gaseous drying medium having an initial temperature in excess of 300° F., and a final drying temperature of approximately 200° F., and then further cooling the particles while in suspension.

10. The method of producing sodium silicate in dry powdered form, which consists in spraying a solution of same under a pressure in excess of 150 lbs. per square inch into a gaseous drying medium having an initial temperature in excess of 300° F., and a final drying temperature of approximately 200° F., and then further cooling the particles to approximately 140° F.

Signed at New York, in the county of New York and State of New York, this 31st day of August, A. D. 1922.

WALTER H. DICKERSON.